(12) United States Patent
Resta et al.

(10) Patent No.: US 8,479,682 B2
(45) Date of Patent: Jul. 9, 2013

(54) APPARATUS FOR APPLYING ADHESIVE TO THE SURFACE OF EXPANDED RESIN PANELS SUPERIMPOSABLE TO FORM LAYERED MATTRESSES

(75) Inventors: Roberto Resta, Faenza (IT); Paolo Resta, Faenza (IT)

(73) Assignee: Resta S.R.L., Faenza (IT)

( * ) Notice: Subject to any disclaimer, the term of this patent is extended or adjusted under 35 U.S.C. 154(b) by 375 days.

(21) Appl. No.: 12/923,228

(22) Filed: Sep. 10, 2010

(65) Prior Publication Data
US 2011/0061592 A1  Mar. 17, 2011

(30) Foreign Application Priority Data
Sep. 14, 2009  (IT) .............................. BO2009A0580

(51) Int. Cl.
  *B05C 1/08* (2006.01)
  *B05C 11/00* (2006.01)
  *B05C 1/02* (2006.01)
(52) U.S. Cl.
  USPC ............ 118/686; 118/676; 118/668; 118/663
(58) Field of Classification Search
  None
  See application file for complete search history.

(56) References Cited

U.S. PATENT DOCUMENTS

| 1,980,216 | A | * | 11/1934 | Merritt | 427/207.1 |
| 4,061,521 | A | * | 12/1977 | Lerner et al. | 156/265 |
| 5,421,887 | A | * | 6/1995 | Guddal | 118/686 |
| 6,475,283 | B1 | * | 11/2002 | Koehn | 118/684 |
| 6,630,028 | B2 | * | 10/2003 | Briese et al. | 118/683 |
| 7,234,590 | B1 | | 6/2007 | Le Borgne | |
| 7,954,451 | B2 | * | 6/2011 | Klein | 118/682 |
| 2005/0173585 | A1 | * | 8/2005 | Casella et al. | 242/532.3 |
| 2008/0058139 | A1 | | 3/2008 | Gilbert | |

FOREIGN PATENT DOCUMENTS

GB  2 419 553 A  5/2006

* cited by examiner

*Primary Examiner* — Dah-Wei Yuan
*Assistant Examiner* — Jethro Pence
(74) *Attorney, Agent, or Firm* — Modiano & Partners; Albert Josef; Daniel J. O'Byrne

(57) ABSTRACT

An apparatus for applying adhesive to the surface of expanded resin panels by means of a gluing roller, comprising a conveyor for feeding a panel, which is arranged upstream of the gluing roller, and a conveyor for receiving the panel, which is arranged downstream of the gluing roller, the conveyors being mutually aligned on a supporting framework so as to have adjacent ends, and means for moving the conveyors between a lowered position and a raised position, the means being controlled by an element for detecting a panel conveyed by the feeding conveyor so as to lift or lower the conveyors to a level at which the surface of the gluing roller is substantially in tangent contact with the panel in order to apply thereon a layer of adhesive.

4 Claims, 11 Drawing Sheets

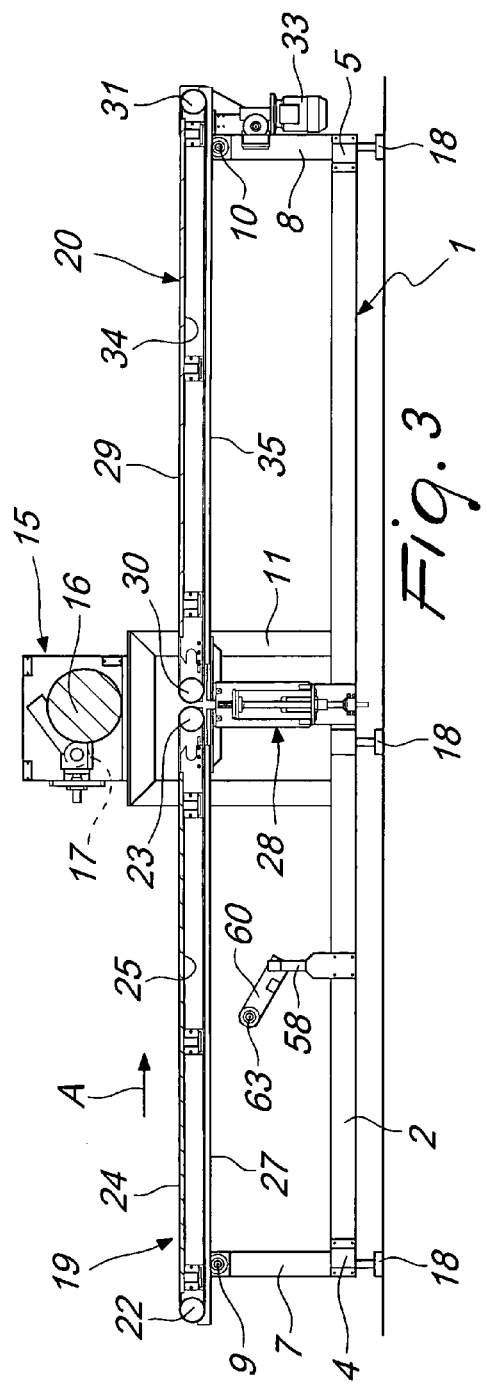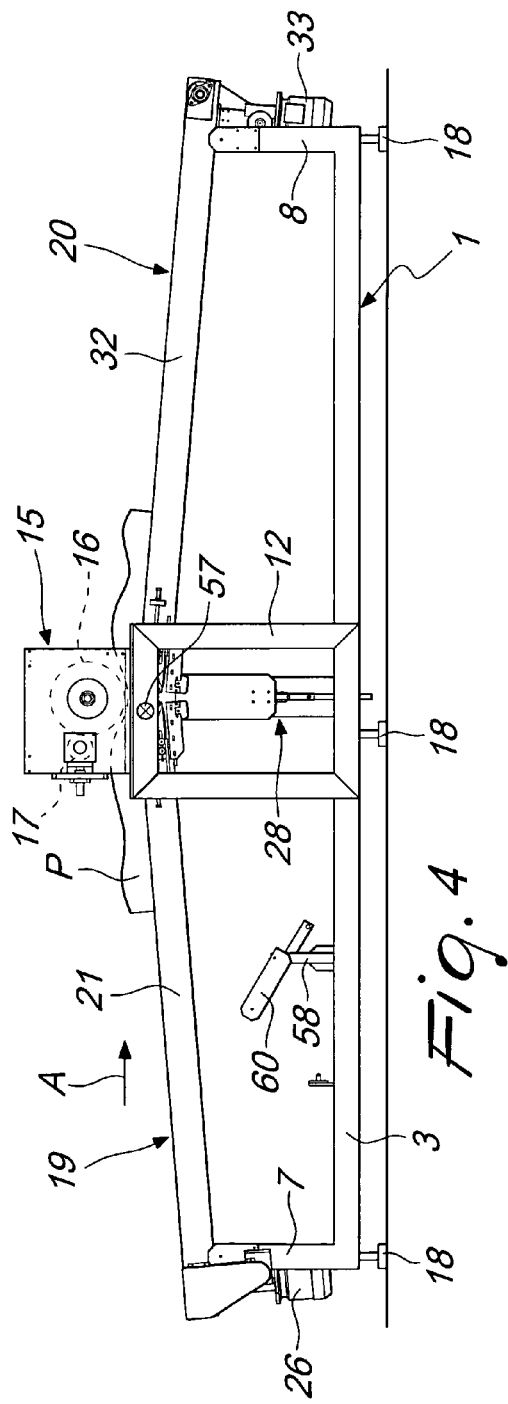

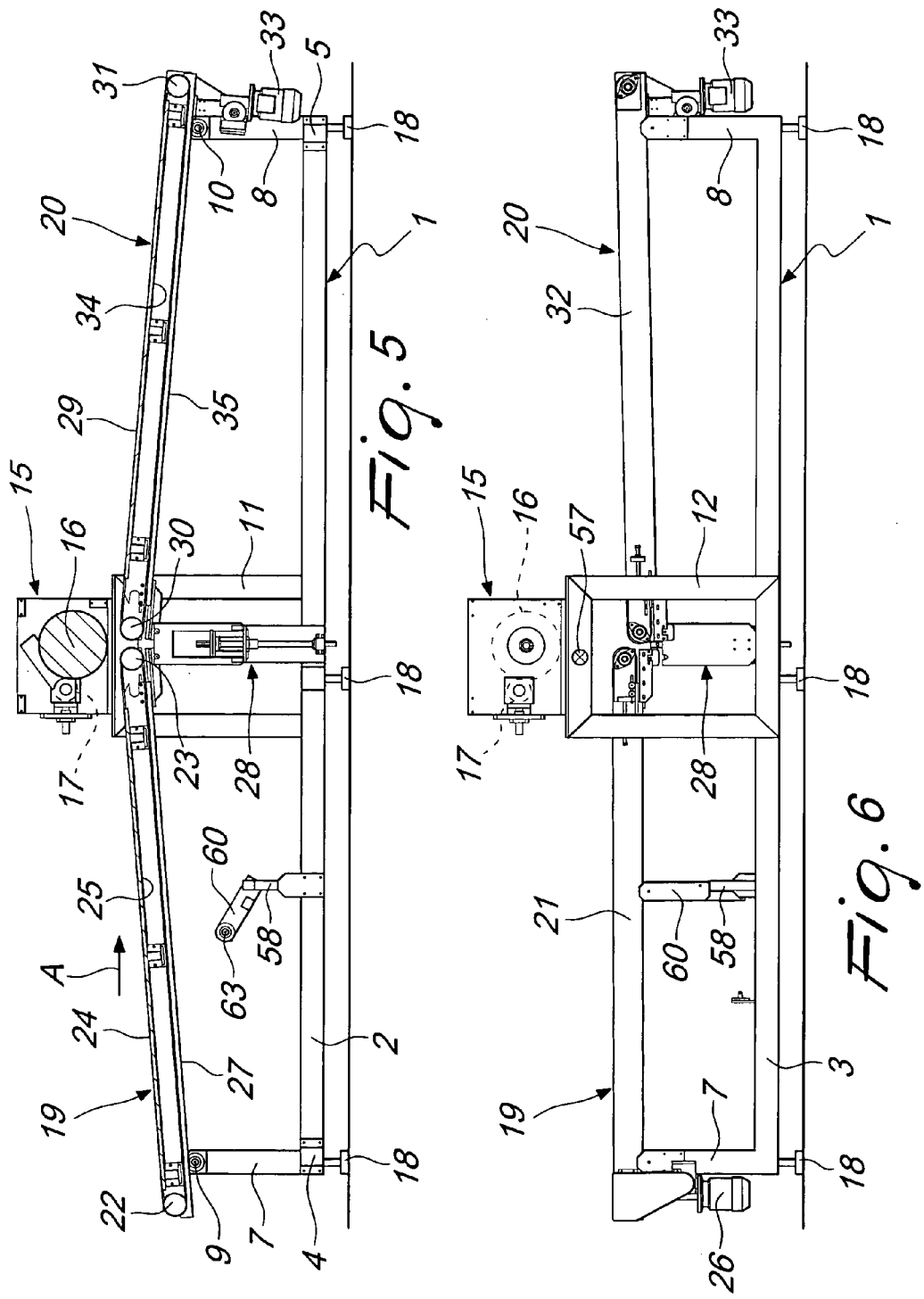

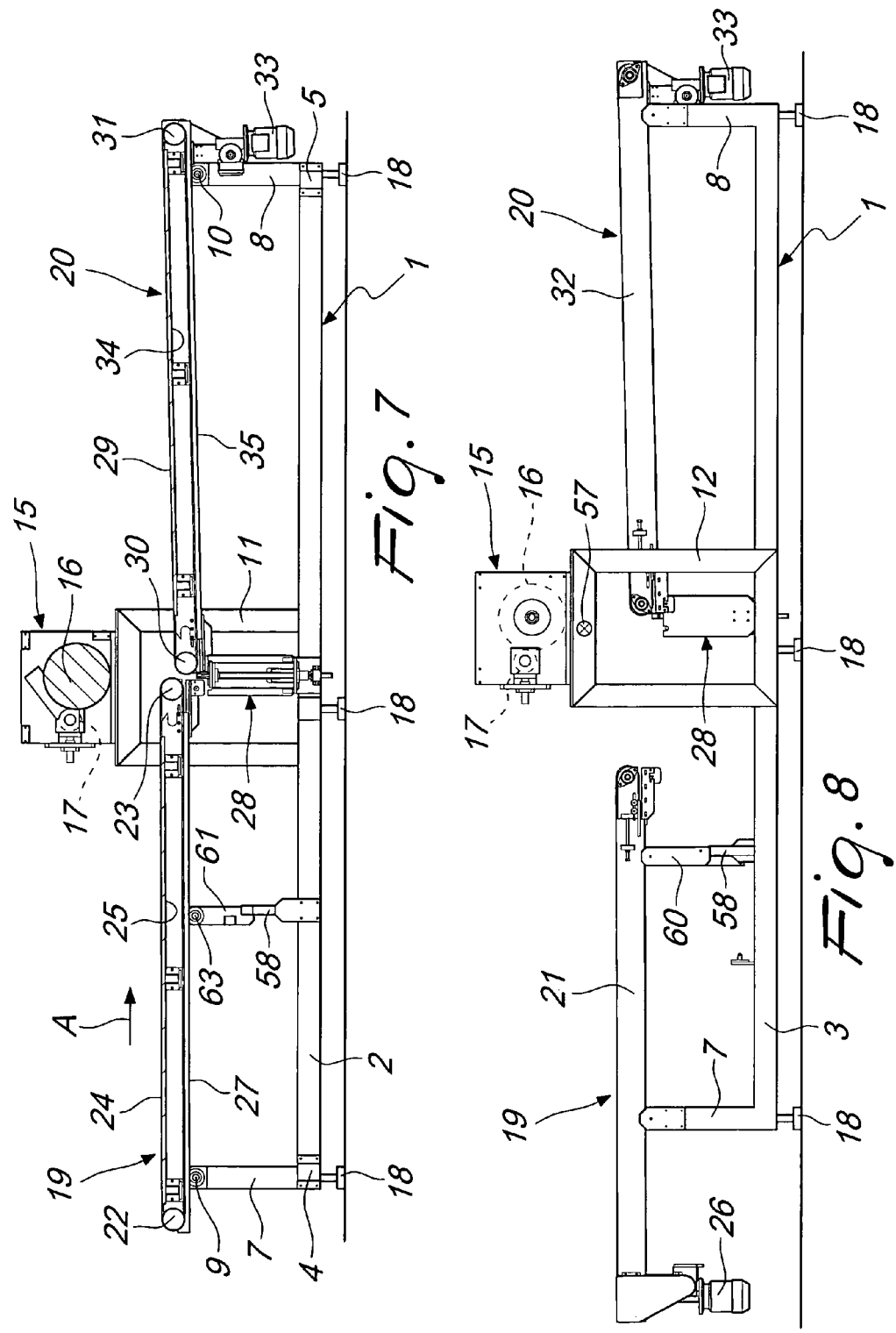

APPARATUS FOR APPLYING ADHESIVE TO THE SURFACE OF EXPANDED RESIN PANELS SUPERIMPOSABLE TO FORM LAYERED MATTRESSES

The present invention relates to an apparatus for applying adhesive to the surface of expanded resin panels superimposable to form layered mattresses. The expression expanded resin also comprises products made of known material, such as natural or synthetic latex foam, sponge rubber and the like. In order to render the terminology uniform, only the definition of expanded resin will be used in the continuation of the present description.

BACKGROUND OF THE INVENTION

Mattresses are known which are constituted by multiple panels made of expanded resin which are superimposed and glued together. The choice of multiple panels superimposed and glued onto each other has the purpose of offering excellent comfort to the user by following the anatomical shape of his/her body with the mattress, varying the characteristics of the latex foam and providing with differentiated carrying capacities regions in the panels.

In the background art, in order to obtain these results, the panels to be superimposed have differences in thickness that make it difficult to spread the adhesive uniformly on the surfaces that must make contact. Thus, for example, when the surface has depressions, raised portions and alveoli, the uniform application of an adhesive layer is very laborious, considering that the adhesive is applied by means of rotating rollers that operate at a fixed level and thus are not able to keep constant the thickness of the layer of adhesive that is deposited on the surface of the panel. These difficulties are heightened when the upper panel of the mattress is made of latex with slow-memory foam, which is particularly soft and remains for a long time wrapped around the gluing roller.

SUMMARY OF THE INVENTION

The aim of the present invention is to devise an apparatus that allows to apply the adhesive uniformly even when the surfaces of the panels that must be joined are not perfectly planar or have even pronounced cavities and raised portions.

This aim and other objects which will become better apparent hereinafter are achieved by an apparatus for applying adhesive to the surface of expanded resin panels by means of a gluing roller, characterized in that it comprises a conveyor for feeding a panel, which is arranged upstream of said gluing roller, and a conveyor for receiving said panel, which is arranged downstream of said gluing roller, said conveyors being mutually aligned on a supporting framework so as to have adjacent ends, and means for moving said conveyors between a lowered position and a raised position, said means being controlled by an element for detecting a panel conveyed by said feeding conveyor so as to lift or lower said conveyors to a level at which the surface of said gluing roller is substantially in tangent contact with said panel in order to apply thereon a layer of adhesive.

BRIEF DESCRIPTION OF THE DRAWINGS

Further characteristics and advantages of the present invention will become better apparent from the following detailed description based on the accompanying drawings, which illustrate, merely by way of non-limiting example, an embodiment of the apparatus. In the drawings:

FIG. 3 is a cutout view of the apparatus, taken along the longitudinal central plane;

FIG. 4 is a side view of the apparatus in an operating situation;

FIG. 5 is a sectional view of the apparatus of FIG. 4, taken along the longitudinal central plane;

FIG. 6 is a side view of the apparatus in the initial step of moving the conveyors in order to perform operations for controlling and cleaning the gluing elements;

FIG. 7 is a sectional view of the apparatus of FIG. 6, taken along the central plane III-III;

FIG. 8 is a side view of the apparatus in the situation in which a conveyor is moved into the position that allows access to the gluing elements;

DESCRIPTION OF THE PREFERRED EMBODIMENTS

Figure 11:
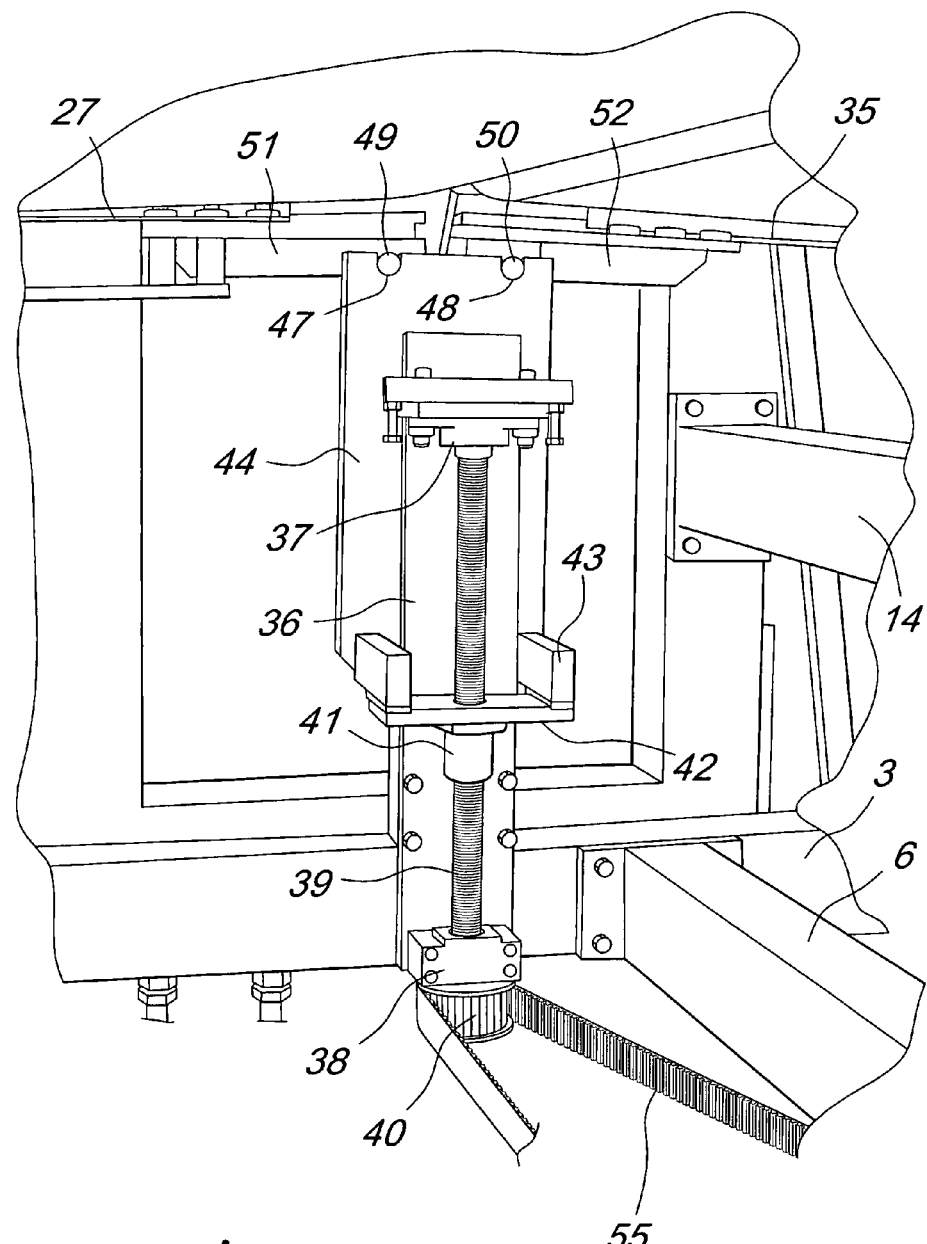

With reference to FIGS. 1, 2, 3 and 13, the reference numeral 1 designates the framework of an apparatus, which comprises a pair of parallel beams 2, 3, connected at their ends by cross-members 4, 5 and, centrally, by a cross-member 6 (see also FIG. 11), so as to form a rectangular base that rests on the plane by means of feet 18.

Two respective pairs of columns 7, 8 rise from the corners formed by the opposite ends of the beams 2, 3 with the cross-members 4, 5, and each column supports, at its top, two respective pairs of coaxial free rollers 9, 10, which are mounted in a cantilever arrangement.

Figure 10:
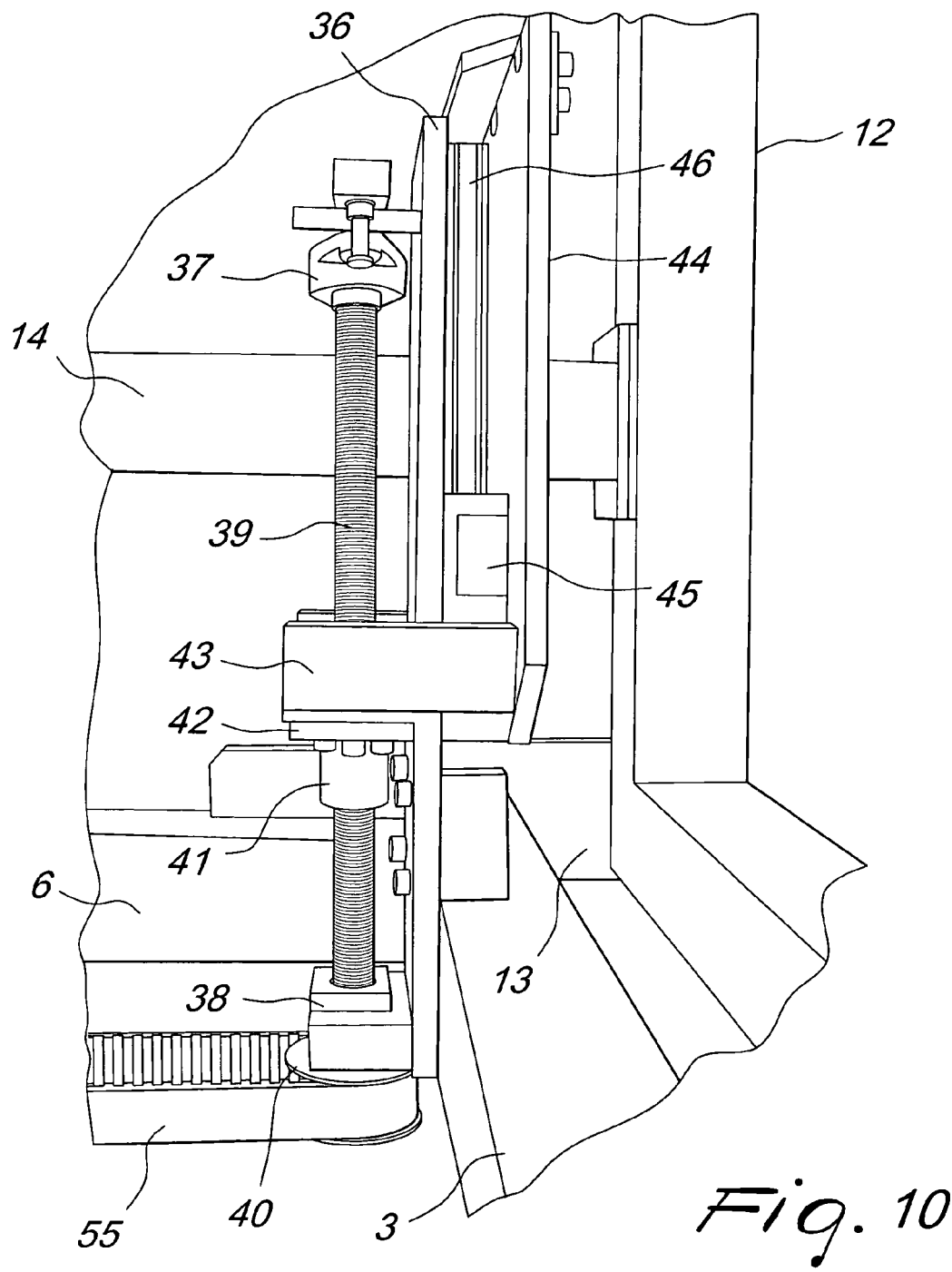
FIGS. 10, 11 are two perspective views of a lifting element.

Two respective sides or shoulders 11, 12 are arranged outside the beams 2, 3 and are composed of elements welded in a rectangular arrangement and connected to the beams 2, 3 by means of brackets 13 and, halfway along their height, by a cross-member 14 (see FIG. 10). The sides 11, 12 support a gluing unit, generally designated by the reference numeral 15, composed of a gluing roller 16 with a horizontal axis, actuated by a gearmotor not shown in the figures, and by a contrast roller 17, which is parallel to the roller 16 and has the function of spreading an adhesive onto the surface of the roller 16. For this purpose, the contrast roller 17 is arranged adjacent to the gluing roller 16 so as to create a channel for containing a fluid adhesive that has a viscous consistency. The roller 16 and the contrast roller 17 are not in tangent contact, but are mutually spaced so as to form a gap through which the adhesive can flow out and form a layer that adheres to the gluing roller in order to be deposited on the upper face of a panel P made of resin designed to form the mattress. Further technical details of the gluing unit 15, such as the devices for adjusting the distance between the roller and the contrast roller in order to control the adhesive layer to be deposited on the panel, are not described because they are of traditional construction and do not relate to the present invention.

In order to spread the adhesive on the panel P there is a device that transfers the panel below the gluing roller. This device is composed of a conveyor 19 for feeding the panel P, which is aligned with a receiving conveyor 20. The feeding conveyor 19 comprises a rectangular frame 21, at the opposite ends of which two rollers 22, 23 are supported. A substantially horizontal belt 24 is wound around the rollers 22, 23 in a closed loop and its upper portion rests slidingly on a supporting surface 25. The roller 22 is motorized by means of a gearmotor 26, which is mounted so as to cantilever on the frame 21, which makes the belt 24 move forward in the direction A, i.e., toward the gluing unit 15.

The frame 21 is composed of two longitudinal members 27, which are joined parallel to each other and on the upper edge of which the supporting surface 25 is fixed. Conveniently, the longitudinal members 27 have the lower edges that lie at a level below the lower portion of the belt 24 and rest, with one end, on the pair of free rollers 9 and, with the opposite ends, on a pair of lifting elements 28, which are arranged, one for each side, on the beams 2, 3 at the sides 11, 12.

The receiving conveyor 20 has a structure that is completely similar but mirror-symmetrical to the one of the feeding conveyor 19. In fact, the conveyor 20, too, comprises a belt 29, which is closed in a loop around a pair of rollers 30, 31 supported so that they can rotate at the opposite ends of a frame 32 and motorized in the same direction A by a gearmotor 33 mounted so as to cantilever on the frame 32. Below the upper portion of the belt 29 there is a resting surface 34, which is fixed on the two lateral longitudinal members 35 of the frame 32 on which the belt 29 slides. The opposite ends of the longitudinal members 35 rest on the pair of free rollers 10 and respectively on the same lifting elements 28 on which the conveyor 19 rests.

Each lifting element 28 (see FIGS. 10, 11) is composed of a plate 36, which is fixed vertically to the respective beam 2 and 3 of the base of the framework 1. Two vertically aligned bushes 37, 38 are fixed to the plate 36, and a threaded shaft 39 is supported rotationally therein. The lower end of the latter extends below the bush 38, and a toothed pulley 40 is keyed thereon. A female thread 41 is engaged, moreover, on the threaded shaft 39 and is fixed to a bracket 42, which by means of two arms 43 that are laterally adjacent to the sides of the bracket 42 is jointly connected to a vertical plate element 44, which is flat and parallel and spaced with respect to the plate 36 so as to form a gap with the latter. The plate 44 constitutes a slider, which is guided vertically by a sliding block 45, which is jointly connected thereof and has a slot with which it slides on a strip 46 which is fixed on the plate 36 that extends vertically in the gap and parallel to the threaded shaft 39.

The slider 44 has, at the top, two recesses or slots 47, 48, which are open upward and are adapted to receive two respective pivots or bearings 49, 50, which are mounted so as to cantilever on ribs 51, 52 jointly connected to the opposite ends of the longitudinal elements 27, 35 of the conveyors 19, 20. More precisely, the engagement of the pivots 49, 50 in the recesses 47, 48 allows, by actuating the two lifting elements 28, to lift and lower the contiguous ends of the two conveyors 19, 20, while the opposite ends of the latter remain at the same level, resting on the rollers 9, 10.

Figure 12:
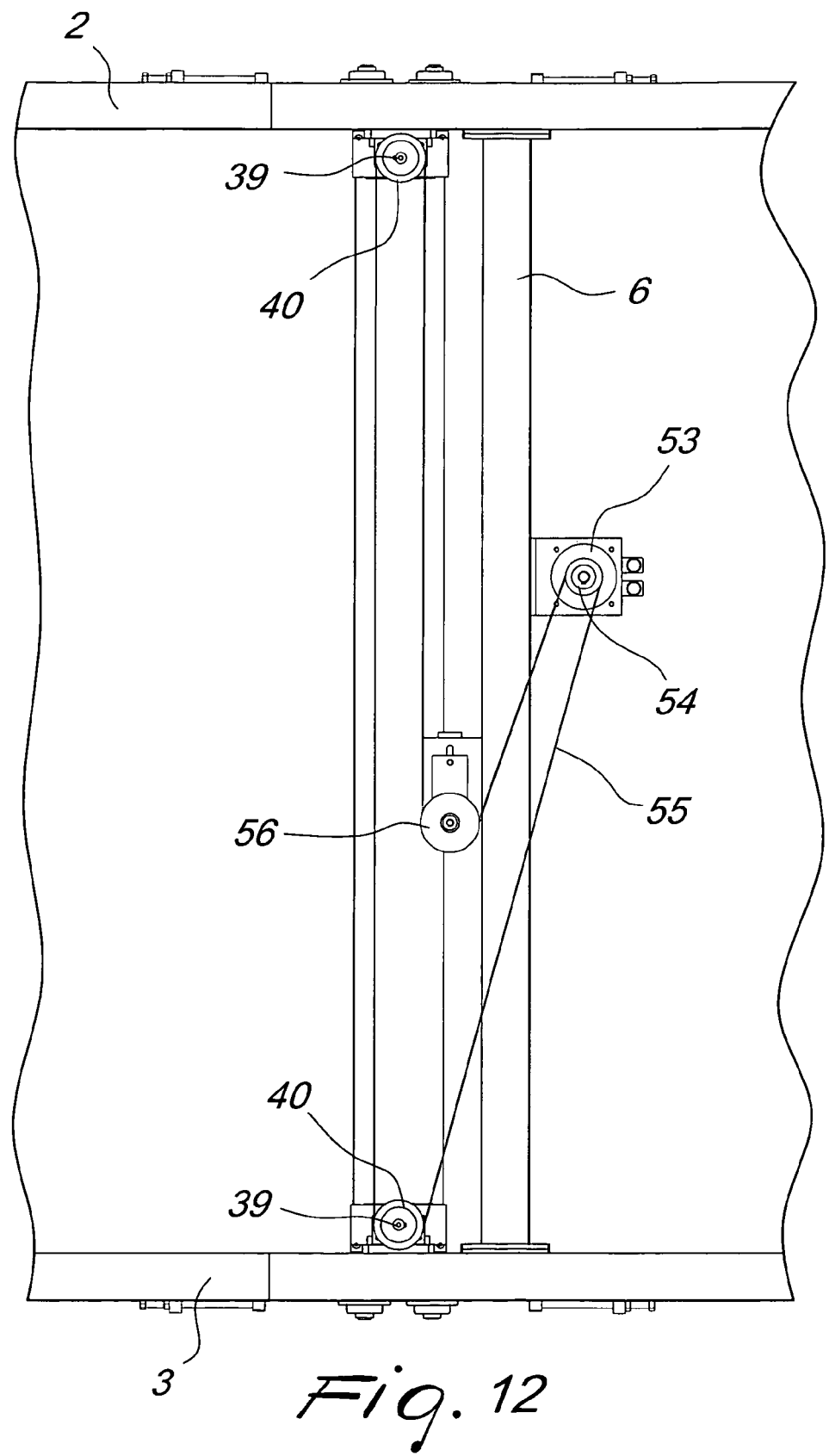
FIG. 12 is a view of the actuation unit of the lifting elements.
Figure 13:
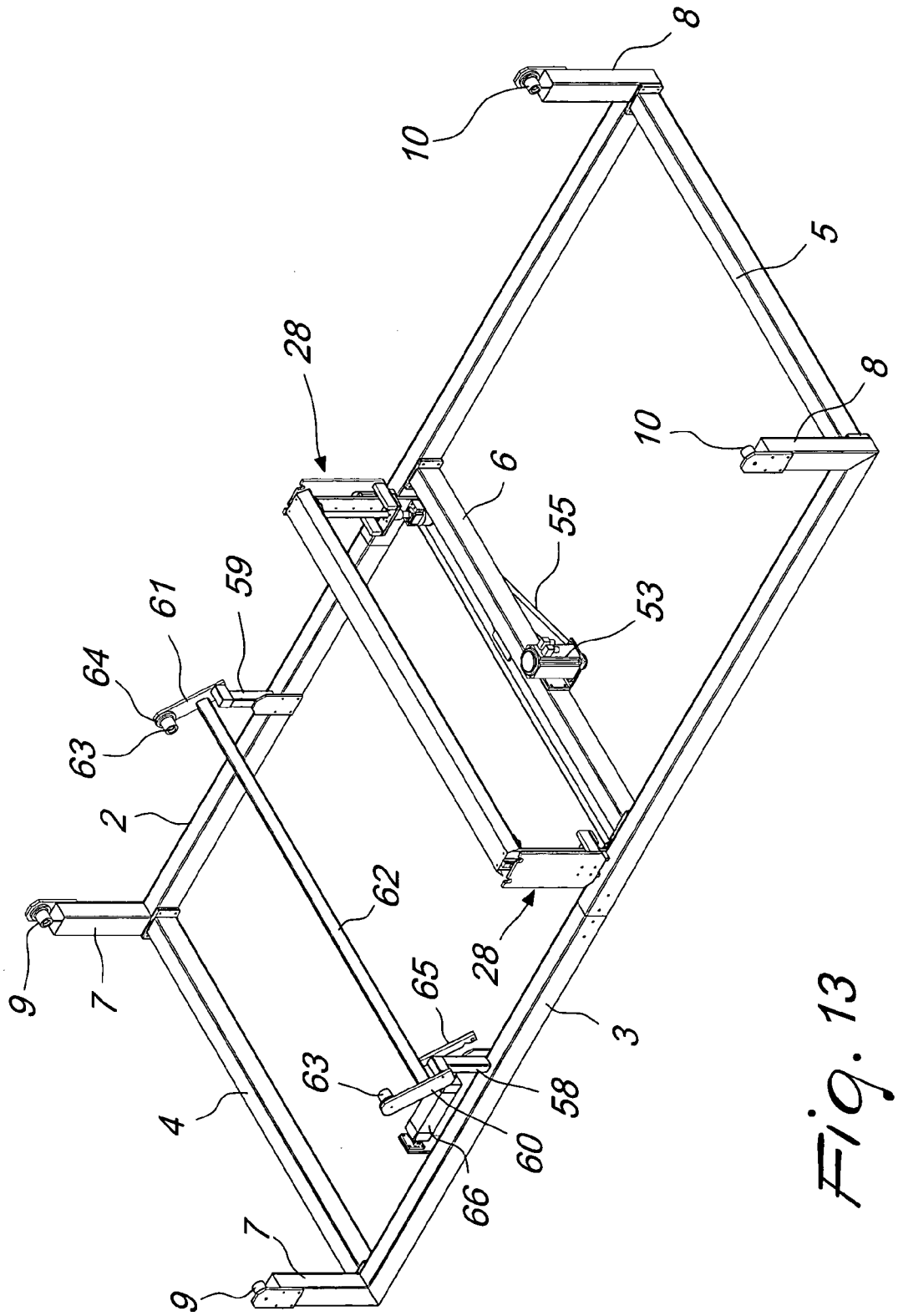
FIG. 13 is a perspective view of the base of the framework, which highlights a device for moving a conveyor in the position for access to the control elements.

The lifting elements 28 are actuated (see FIG. 12) by means of an electric motor 53 of the reversible type, which is installed on the cross-member 6 of the base of the apparatus and has a toothed pulley 54 around which a toothed belt 55 meshes which is closed in a loop around the toothed pulleys 40 keyed on the two shafts 39 of the two lifting elements 28 and a fifth guiding pulley 56. As shown by FIG. 12, the belt 55 has a zigzag path in order to ensure the meshing of the belt with the toothed pulleys 40. The activation of the electric motor 53 is controlled by an electronic unit capable of ascertaining the passage, below the gluing roller, of the panels that in each instance are conveyed by the conveyors 19, 20. Advantageously, this unit comprises a photocell detector of the known type, which therefore is not described, conveniently arranged below the gluing roller 16, shown schematically in the drawings and designated by the reference numeral 57. The detector 57 (see FIG. 1), after ascertaining that a panel P is present in transit in front of it, provides for the actuation of the electric motor 53 so as to activate the lifting elements 28 in the direction for raising or lowering the conveyors to the level at which the surface of the panel on which the adhesive is to be applied is arranged on the plane of tangency with the gluing roller.

The operation of the apparatus is fully comprehensible from the above description.

Figure 1:
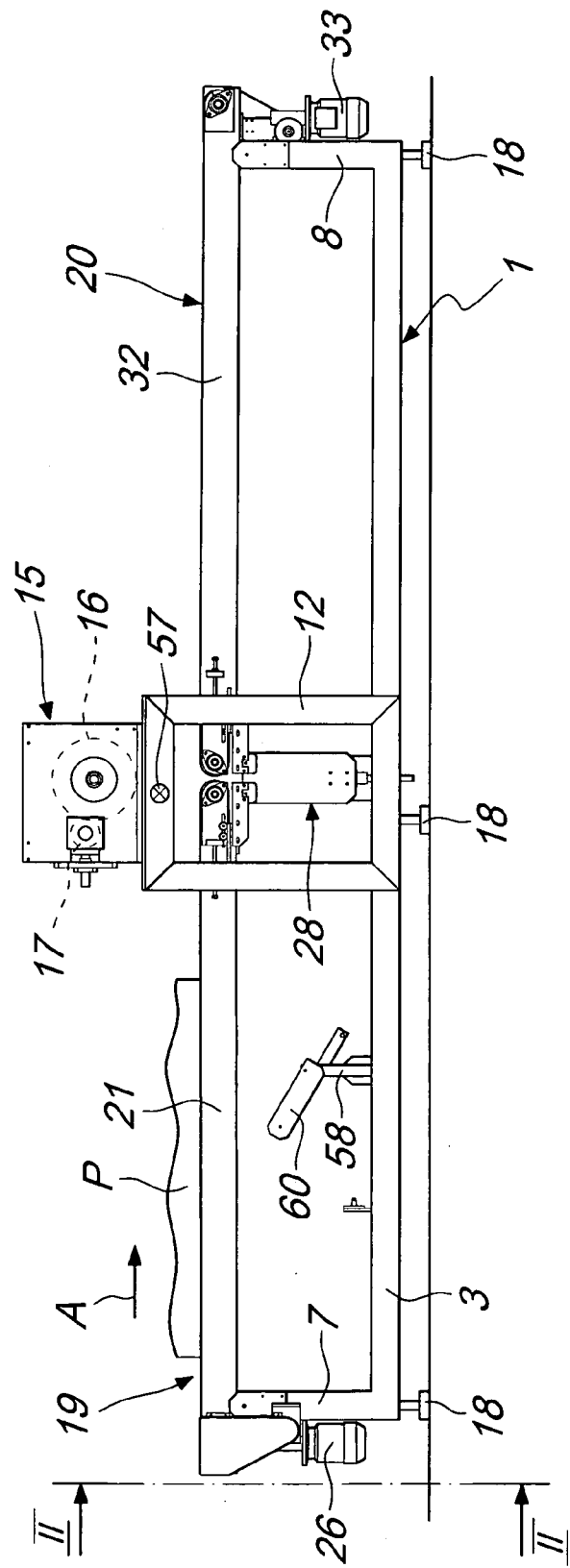
FIG. 1 is a side view of an apparatus according to the invention.
Figure 2:
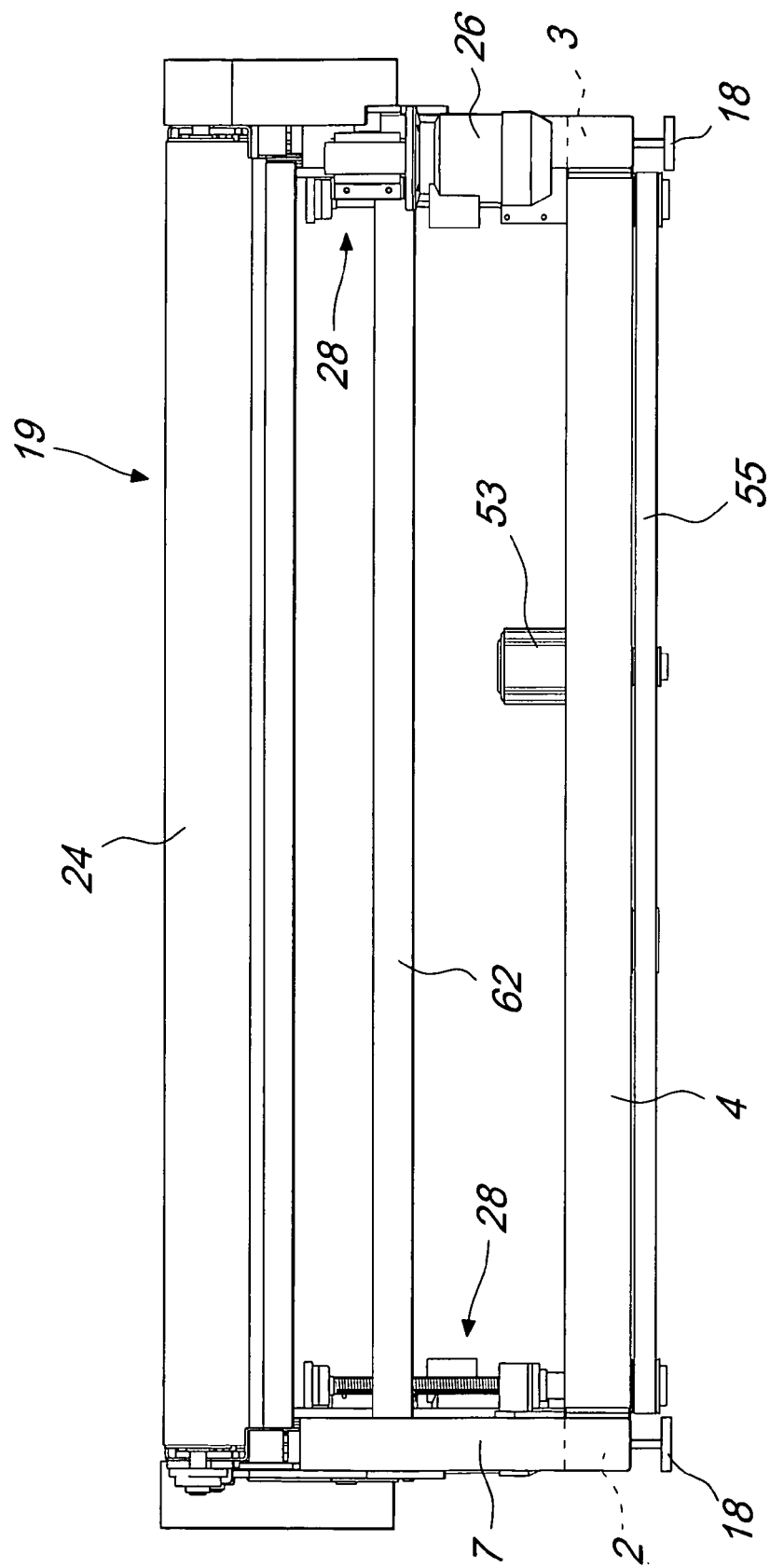
FIG. 2 is a view taken along the line II-II of FIG. 1.
Figure 9:
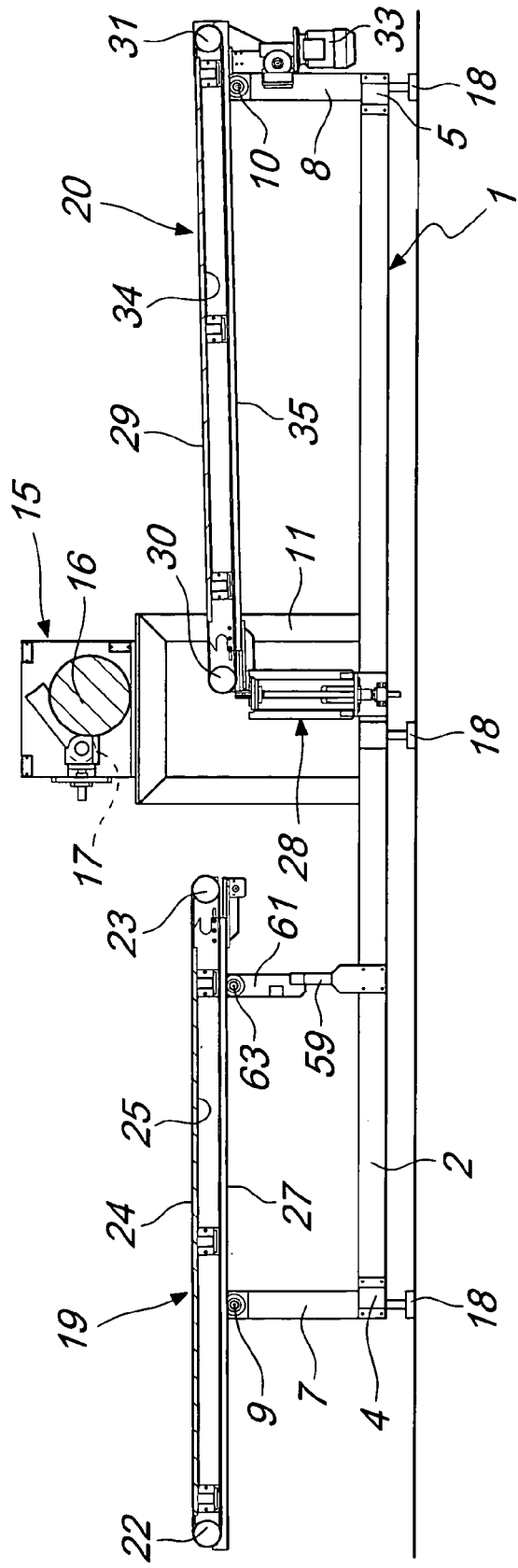
FIG. 9 is a sectional view of the apparatus of FIG. 8, taken along the longitudinal central plane.

Assume that a layer of adhesive is to be applied on a panel P that has an irregular cross section, for example a lower flat surface and an upper undulated one, as shown in FIG. 1. Likewise, assume that the panel is arranged on the belt 24 of the conveyor 19 in a perfectly horizontal arrangement. By actuating the conveyor 19, the panel P, by passing in front of the detector 57, activates the electric motor 53, which actuates the lifting elements 28 to lift or lower the feeding conveyor 19 and thereby the receiving conveyor 20 until the upper face of the panel P is brought into a tangent position with respect to the overlying gluing roller. FIGS. 4, 5 illustrate a situation in which the conveyors 19, 20 have been lifted, since the thickness of the panel P is too low for the surface of the panel to make contact, during advancement, with the gluing roller in order to apply the adhesive. As the panel P advances under the gluing roller 16, the lifting elements 28 lift and lower continuously the conveyors 19, 20 in order to allow the panel to follow the undulated shape of the surface of the panel and ensure the constant contact of the gluing roller on the panel and a uniform distribution of the adhesive on the raised portions and depressions of the surface. When the panel is completely transferred onto the receiving conveyor 20, the detector 57 returns the conveyors to the initial horizontal plane, thus preparing the control of the lifting elements according to the characteristics of the next panel, which can be equal or different with respect to those of the panels previously provided with adhesives.

As can be seen, the apparatus achieves the intended aim and object. In particular, the layer of adhesive can be applied also on uneven surfaces or surfaces provided with alveoli. In particular, attention is called to the fact that in the case of panels having an alveolar or wrinkled surface, due to the arc-like shape that the panels can assume by way of the action of the lifting elements on the conveyors at the gluing roller, it is possible to stretch the ridges of the wrinkles and of the ribs that divide the alveoli and obtain thereon a more uniform distribution of the adhesive.

Figure 14:
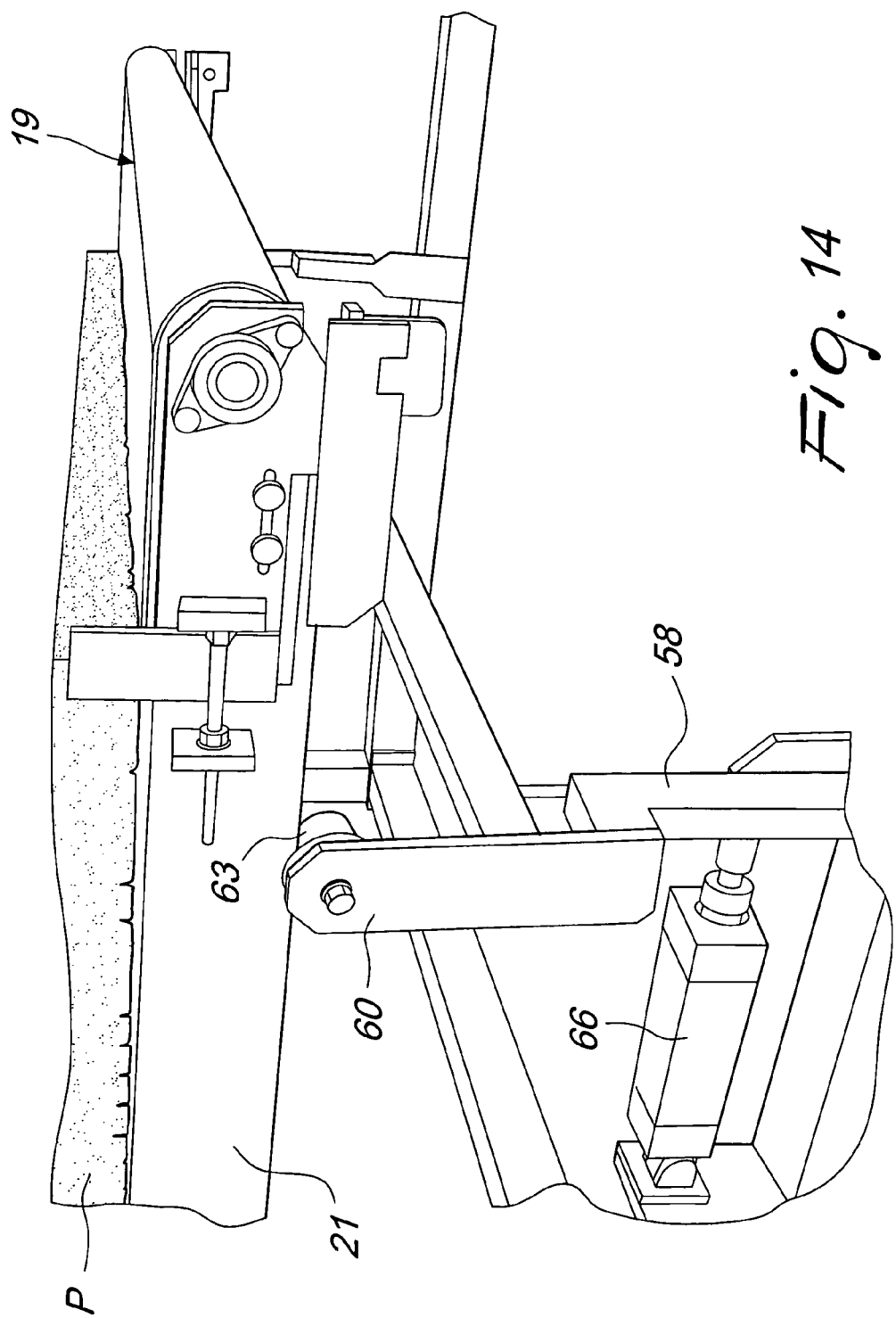
FIG. 14 is a view of a detail of the device for moving a conveyor.

According to a preferred embodiment, which is incorporated into the described apparatus and is shown in FIGS. 14, 15, there is the possibility to move away one or both of the conveyors 19, 20 from the gluing roller 16 in order to allow an easy access to the gluing unit 15 and allow to perform interventions for inspecting and cleaning the roller.

For this purpose, two respective vertical columns 58, 59 (see FIGS. 13, 14) are fixed on the beams 2, 3 of the base of the apparatus, and arms 60, 61 are articulated to their top and are connected so as to be parallel to each other by a transverse bar 62. The arms are arranged below the beams 21 of the conveyor 19, and at their ends free rollers 63 are supported which can rotate on pivots and are provided with annular flanges 64.

A radial lever 65 is jointly connected to the arm 60 and is coupled articulately to the stem of a fluid-operated actuator 66, the cylinder of which is connected articulately on the beam 3. In the inactive position of the arms 60, 61, the conveyor 19 rests on the lifting elements 28 so that the pivots 49, 50 engage in the recesses 47, 48. When there is the need to access the gluing unit 15, by activating the actuator 66 the arms 60, 61 are made to oscillate in a vertical shoring position with the free rollers 63 in contact with the beams 27. By actuating the lowering of the receiving conveyor 20, the feeding conveyor is made to rest on the arms 60, 61 and the pivots 50 are disengaged from the recesses 48 (see FIGS. 6, 7). At this point it is possible to let the feeding conveyor 19 slide on the free rollers 9 and 63 in order to move it away from the gluing unit 15 and allow the interventions of the assigned personnel. It should be noted that the annular flanges 64 of the rollers 63 help to keep the conveyor 19 guided, preventing it from being able to deviate laterally. For the same purpose, the rollers 9, 10 also are provided with guiding annular flanges. Of course, a similar solution is possible for moving away the receiving conveyor 20.

The described apparatus is susceptible of further modifications and variations, all of which are within the scope of the appended claims. In particular, it is possible to provide hydraulically-actuated lifting elements instead of mechanically-actuated lifting elements.

The disclosures in Italian Patent Application No. BO2009A000580 from which this application claims priority are incorporated herein by reference.

What is claimed is:

1. An apparatus for applying adhesive to the surface of expanded resin panels comprising:
   a gluing roller;
   a feeding conveyor for feeding a panel, which is arranged upstream of said gluing roller;
   a receiving conveyor for receiving said panel, which is arranged downstream of said gluing roller;
   said conveyors being mutually aligned on a supporting framework so as to have adjacent ends; and
   lifting means for moving said conveyors between a lowered position and a raised position, said lifting means being controlled by an element for detecting a panel conveyed by said feeding conveyor so as to lift or lower said conveyors to a level at which a surface of said gluing roller is in tangent contact with the panel in order to apply thereon a layer of adhesive;
   said feeding and receiving conveyors each comprising a frame, which has two, parallel beams, a pair of rollers supported at opposite ends of said beams, a belt which, is closed in a loop around said rollers and which is actuated by a gearmotor, said frames having their adjacent ends coupled to said lifting means and their opposite ends resting movably on rollers supported on said framework;
   said lifting means being constituted by a pair of lifting elements, each of which is composed of a plate-like element, which is fixed to said framework, by a pair of bushes, which are fixed to said plate-like element and are aligned vertically, by a threaded shaft, which is supported rotationally within said bushes, by a toothed pulley, which is keyed to one end of said shaft, and by a female thread, which is engaged on said shaft and is fixed to a slider element, which is guided vertically on said plate-like element, two respective pivots being pivoted in said slider element and being mounted at the adjacent ends of said frames of said conveyors, the pulleys of said lifting elements being actuated by an electric motor of the reversible type by means of a toothed belt, so as to actuate said threaded shafts to lift said slider elements until both conveyors are in tangent contact with said gluing roller.

2. The apparatus according to claim 1, wherein said pivots are pivoted within recesses of said slider element, which are open upward in order to produce a position of engagement and disengagement of said pivots with respect to said recesses, means being provided which are adapted to support at least one conveyor when the lifting elements are lowered to a level of disengagement of the pivots of said conveyor from the respective recesses, said means being adapted to allow the spacing of said conveyor from the gluing roller.

3. The apparatus according to claim 2, wherein said supporting means comprise a pair of arms, which are connected to each other in a parallel arrangement by a bar and are articulated on said framework below at least one conveyor, a pair of rollers, which can rotate at the ends of said arms and are provided with an annular flange, an actuator for actuating said arms between an inactive position, in which the pivots of said conveyor are engaged within said recesses of the lifting elements, and a position in which said conveyor rests on said rollers when said lifting elements are lowered to a height at which said pivots of said conveyor are disengaged from said recesses.

4. The apparatus according to claim 1, wherein said detecting element is of the type with a photoelectric cell for continuous detection of the thickness of the panel and continuous control of the lifting elements to a height at which the upper face of said panel is at the level at which it is tangent to the gluing roller.

* * * * *